(12) United States Patent
Yen et al.

(10) Patent No.: US 7,511,560 B2
(45) Date of Patent: Mar. 31, 2009

(54) CHARGE PUMP CIRCUIT

(75) Inventors: Chih-Jen Yen, Hsinchu (TW);
Chih-Yuan Hsieh, Hsinchu (TW)

(73) Assignee: Novatek Microelectronics Corp.,
Hsinchu (TW)

( * ) Notice: Subject to any disclaimer, the term of this patent is extended or adjusted under 35 U.S.C. 154(b) by 7 days.

(21) Appl. No.: 11/758,015

(22) Filed: Jun. 5, 2007

(65) Prior Publication Data

US 2008/0231347 A1    Sep. 25, 2008

(30) Foreign Application Priority Data

Mar. 20, 2007    (TW) .............................. 96109468 A

(51) Int. Cl.
*G05F 1/10* (2006.01)
*G05F 3/02* (2006.01)
(52) U.S. Cl. .......................... 327/536; 327/537; 363/60
(58) Field of Classification Search ................. 327/536, 327/537; 363/59, 60
See application file for complete search history.

(56) References Cited

U.S. PATENT DOCUMENTS 6,483,377 B2 * 11/2002 White et al. ................. 327/536
6,924,683 B1 * 8/2005 Hayter ....................... 327/218

* cited by examiner

*Primary Examiner*—Donovan Lincoln
*Assistant Examiner*—Patrick O'Neill
(74) *Attorney, Agent, or Firm*—Jianq Chyun IP Office

(57) ABSTRACT

A charge pump circuit including a plurality of switches and a switch control circuit is provided. The charge pump circuit is suitable for a display panel. The switches switch from "off" state to "on" state in an enable transition, and switch from "on" state to "off" state in a disable transition. The switch control circuit is coupled to the switches for controlling the on/off states of the switches and allowing the charge pump circuit to provide an output voltage that is different from an input voltage. The switch control circuit prolongs the time required for enable transition of the switches to be longer than the time for disable transition thereof. The equivalent impedances of the switches change from high values to low values when the switches are at the enable transition.

25 Claims, 5 Drawing Sheets

CHARGE PUMP CIRCUIT

CROSS-REFERENCE TO RELATED APPLICATION

This application claims the priority benefit of Taiwan application serial no. 96109468, filed Mar. 20, 2007. All disclosure of the Taiwan application is incorporated herein by reference.

BACKGROUND OF THE INVENTION

1. Field of the Invention

The present invention generally relates to a charge pump circuit, and more particularly, to a charge pump circuit which can reduce voltage spike.

2. Description of Related Art

Various voltage source levels are usually required in an electronic apparatus, thus, a charge pump circuit is usually employed to generate voltage sources of different levels. Plural charge pump circuits are applied in power supply circuit of display panel.

FIG. 1 illustrates a conventional charge pump circuit. Referring to FIG. 1, the charge pump circuit 100 includes a switch control circuit 102, switches 104~107, a capacitor CS, and a capacitor CL. The conventional switch control circuit 102 generates two clock signals ph11 and ph12 which have non-overlapping duty cycles for controlling the on/off of the switches 104~107, so that the charge pump circuit 100 can provide an output voltage Vo different from an input voltage Vi.

FIG. 2 is a waveform of clock signals of the switch control circuit 102 in FIG. 1. When the clock signal ph11 is enabled, the switches 104 and 105 are turned on, and the capacitor CS is charged; and when the clock signal ph12 is enabled, the switches 106 and 107 are turned on, and the capacitor CS is discharged while the capacitor CL is charged.

To describe the disadvantage of the conventional charge pump circuit here, it is assumed that the voltage originally spanning over the capacitor CS or CL is V1, a voltage about to span over one of the capacitors is V2, and it is assumed that in a first case, the voltages V1 and V2 are close to each other, while in a second case, the voltages V1 and V2 are very different. For instance, when the voltage V2 spans over the capacitor CS or CL, a voltage spike is produced instantaneously due to the voltage sag (V1>>V2) or voltage swell (V1<<V2) over the capacitor. Thus, according to foregoing assumption, the voltage spike in the second case is greater than the voltage spike in the first case.

Referring to FIG. 2 again, in the conventional charge pump circuit, the transition slope of the clock signal ph11 or ph12 from a logic low level to a logic high level is vertical, and the transition slope thereof from a logic high level to a logic low level is also vertical. Besides, since the actions of the switches 104~107 are controlled by the clock signal ph11 or ph12, the switches 104~107 are turned on/off quickly, so that the potential difference of the voltages over the capacitors CS and CL is always in transient changes, and accordingly continuous voltage spikes are produced.

The disadvantages of voltage spike in the application of the conventional charge pump circuit will be described herein. When a conventional charge pump circuit is applied to a small-size display panel, voltage spikes are produced at instances when switches are enabled, so that the common voltage in the display panel is disturbed and accordingly the pixel quality of the display panel is affected. In addition, if the conventional charge pump circuit is applied to a large-size display panel, the working frequencies of the clock signals ph11 and ph12 are usually increased in order to reach certain driving capability due to insufficient pixel driving capability of the conventional charge pump circuit. However, such increase in working frequencies of the clock signals may cause increase in voltage spikes and coupling between voltage spikes and some of the pixel data, therefore incorrect pixel data will be produced and both grey scale performance and image quality of the display panel will be affected.

Moreover, currently, the trend of designing a chip is towards minimization in die size. However, when applied to a display panel, the working frequency of the charge pump circuit has to be increased due to insufficient driving capability of the minimized charge pump circuit, and such increase in working frequency may produce more continuous voltage spikes and accordingly affect the display quality of the display panel.

SUMMARY OF THE INVENTION

Accordingly, the present invention is directed to a charge pump circuit, wherein the turn-on speeds of switches are controlled so that the equivalent impedances of the switches change from high values to low values when the switches transmit from off state to on state, and accordingly the voltage change of a capacitor can be slowed down and noises caused by voltage spikes can be reduced during a charging procedure and the output of the charge pump circuit can be stabilized.

First, the transitions of a switch may be defined as follows. The enable transition may be defined as a transition when a switch transmits from off state to on state, and the disable transition may be defined as a transition when the switch transmits from on state to off state.

The present invention provides a charge pump circuit including a plurality of switches and a switch control circuit. The charge pump circuit is suitable for a display panel. The switch control circuit is coupled to the switches for controlling the on/off states of the switches and allowing the charge pump circuit to provide an output voltage different from an input voltage. The switch control circuit prolongs the time required for enable transition of the switches than the time required for disable transition thereof, wherein the equivalent impedances of the switches change from high values to low values when the switches are at enable transition.

According to an embodiment of the present invention, the switch control circuit includes a switch driving circuit. The switch driving circuit adjusts a first clock signal to obtain a second clock signal and outputs the second clock signal to the control terminal of the controlled switch. The time required for enable transition of the controlled switch is longer than the time for disable transition thereof. When the controlled switch is at enable transition, the current or voltage of the second clock signal increases or decreases slowly to a constant value, and the equivalent impedance of the controlled switch changes from a high value to a low value.

The present invention further provides a charge pump circuit including a plurality of switches, a switch driving circuit, and a clock generating circuit. The charge pump circuit is suitable for a display panel. The switch driving circuit is coupled to the switches for receiving a first clock signal and outputs a second clock signal for controlling the on/off states of the switches. The clock generating circuit is coupled to the switch driving circuit for generating the first clock signal and allowing the charge pump circuit to provide an output voltage different from an input voltage. The switch driving circuit prolongs the time required for enable transition of the switches longer than the time required for disable transition thereof. The equivalent impedances of the switches change from high values to low values when the switches are at enable transition.

According to an embodiment of the present invention, the switch driving circuit adjusts the first clock signal to obtain the second clock signal and outputs the second clock signal to a control terminal of a controlled switch, wherein the time required for enable transition of the controlled switch is longer than the time required for disable transition thereof. When the controlled switch is at enable transition, the current or voltage of the second clock signal increases or decreases slowly to a constant value, and the equivalent impedance of the controlled switch changes from a high value to a low value.

The present invention provides another charge pump circuit including a plurality of switches and a switch control circuit. The switch control circuit is coupled to the switches for controlling the on/off states of the switches and allowing the charge pump circuit to provide an output voltage different from an input voltage. The switch control circuit makes the time required for enable transition of the switches longer than the time required for disable transition thereof. The equivalent impedances of the switches change from high values to low values when the switches are at enable transition.

In the present invention, a switch control circuit is adopted in a charge pump circuit for controlling the on/off states of a plurality of switches and allowing the charge pump circuit to provide an output voltage that is different from an input voltage. The switch control circuit makes the time required for enable transition of the switches longer than the time required for disable transition thereof. When the switches are at enable transition, the equivalent impedances of the switches change from high values to low values, so that the transient change in the voltage over the capacitor during charge/discharge procedure is slowed down and accordingly noises caused by voltage spikes are reduced and output voltage is stabilized.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
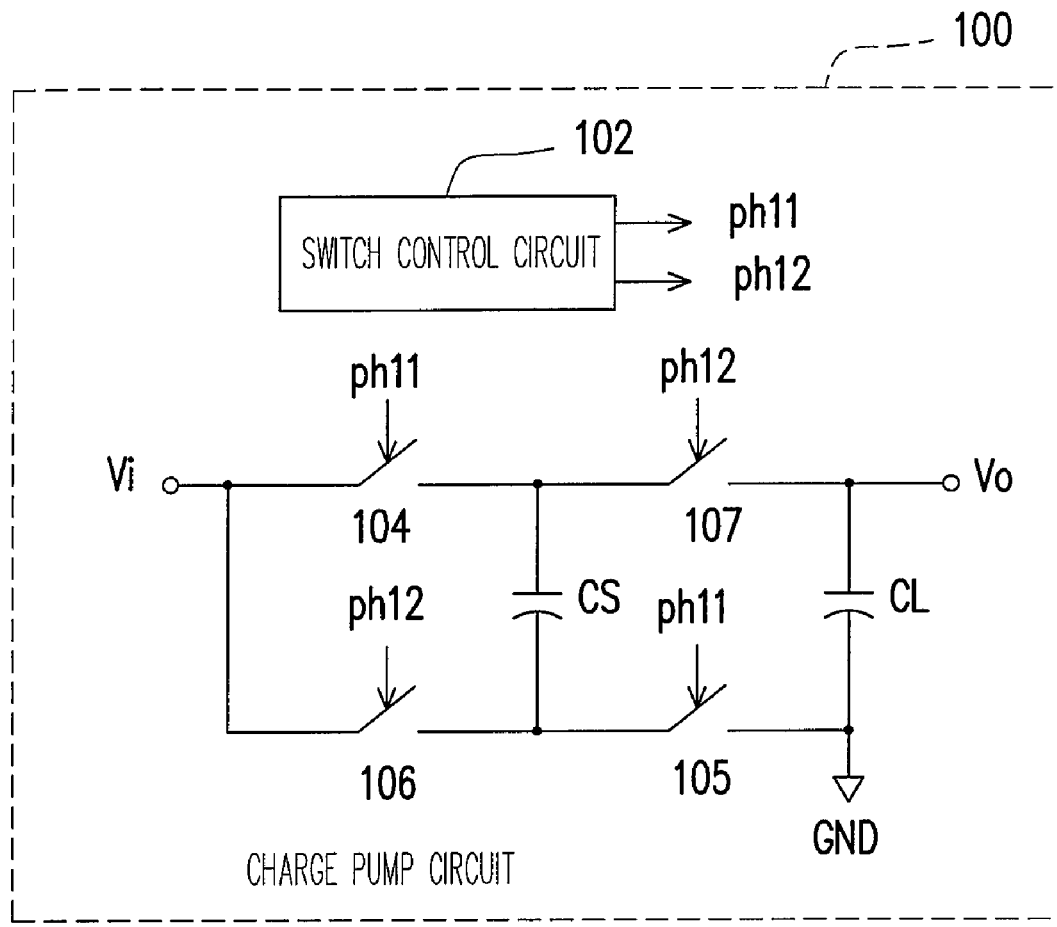
FIG. 1 illustrates a conventional charge pump circuit.
Figure 2:
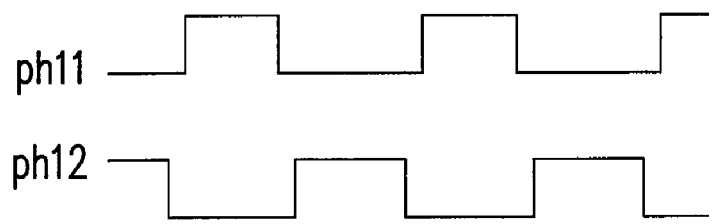
FIG. 2 is a waveform of clock signals of the switch control circuit 102 in FIG. 1.

Reference will now be made in detail to the present embodiments of the invention, examples of which are illustrated in the accompanying drawings. Wherever possible, the same reference numbers are used in the drawings and the description to refer to the same or like parts.

Figure 3:
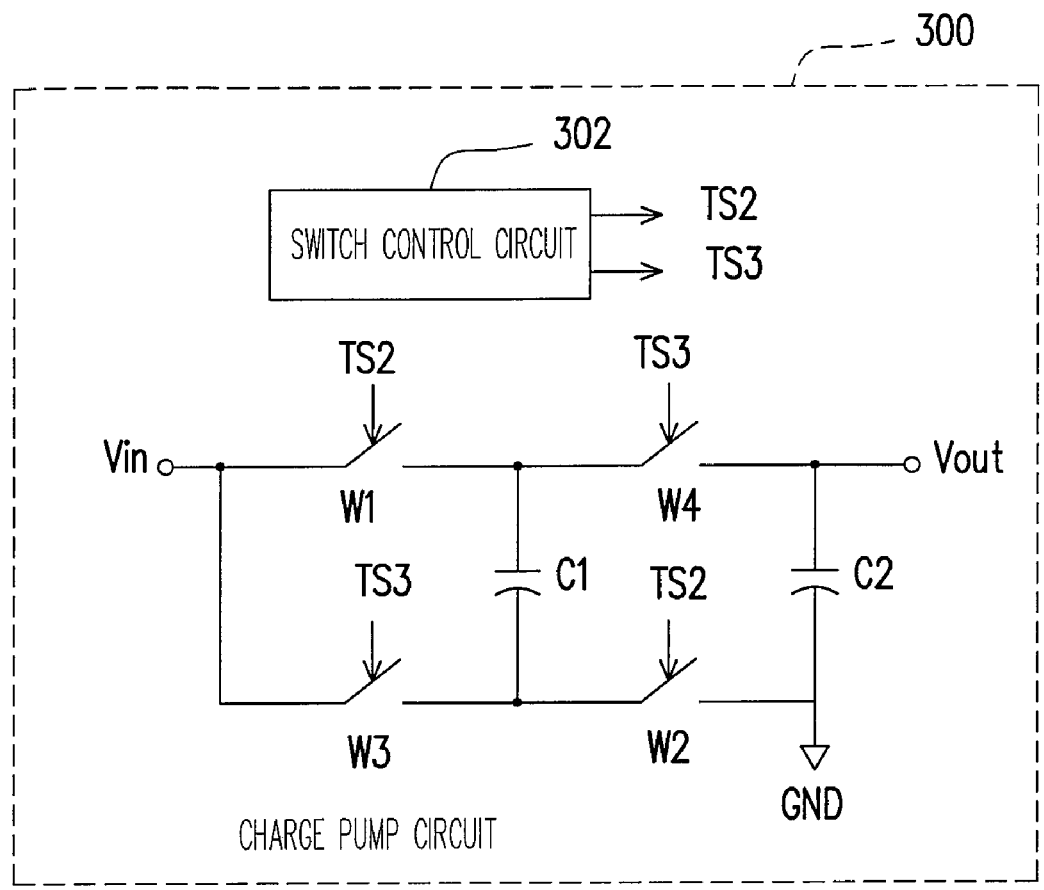
FIG. 3 illustrates a charge pump circuit according to an embodiment of the present invention.

FIG. 3 illustrates a charge pump circuit according to an embodiment of the present invention. Referring to FIG. 3, the charge pump circuit 300 is suitable for a display panel, which includes a switch control circuit 302, switches W1~W4, a capacitor C1, and a capacitor C2, wherein each of the switches W1~W4 has a first terminal, a second terminal, and a control terminal, and each capacitor has a first terminal and a second terminal. The couplings between foregoing components will be described herein. The first terminal of the switch W1 is coupled to an input voltage Vin, and the second terminal of the switch W1 is coupled to the first terminal of the switch W4 and the first terminal of the capacitor C1. The first terminal of the switch W3 is coupled to the input voltage Vin and the first terminal of the switch W1, and the second terminal of the switch W3 is coupled to the first terminal of the switch W2 and the second terminal of the capacitor C1. The second terminal of the switch W4 is coupled to the first terminal of the capacitor C2, and the second terminal of the switch W2 is coupled to the second terminal of the capacitor C2 and the ground. The output of the switch control circuit 302 is coupled to the control terminals of the switches W1~W4.

As described above, the switch control circuit 302 outputs two clock signals TS2 and TS3, which have non-overlapping duty cycles, for controlling the on/off states of the switches W1~W4 so that the charge pump circuit 300 can provide an output voltage Vout that is different from an input voltage Vin, wherein the output voltage Vout is obtained at the coupling point between the switch W4 and the capacitor C2. The clock signal TS2 is used for controlling the switches W1 and W2, and the clock signal TS3 is used for controlling the switches W3 and W4.

Figure 4:
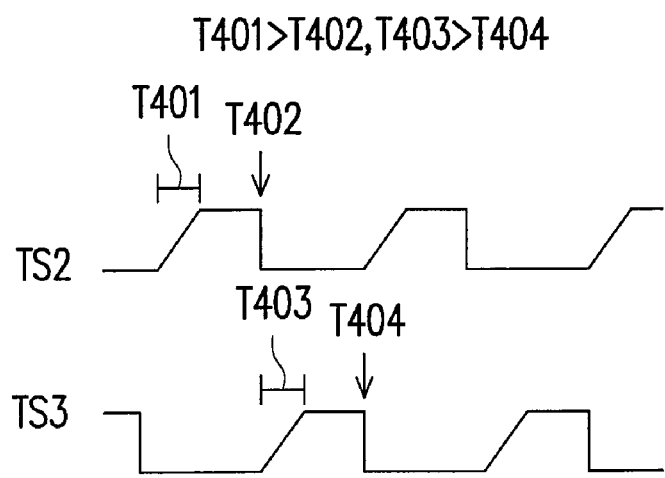
FIG. 4 is a waveform of clock signals in the embodiment illustrated in FIG. 3.

FIG. 4 is a waveform of clock signals in the embodiment illustrated in FIG. 3. First, two terms "enable transition" and "disable transition" are defined, wherein "enable transition" is defined as a transition when the switches W1~W4 in FIG. 3 change from "off" state to "on" state, and "disable transition" is defined as a transition when the switches W1~W4 change from "on" state to "off" state. Taking the output of the switch control circuit 302 as example, referring to FIG. 4, the clock signal TS2 prolongs the time T401 required for enable transition of the switch W1 (or the switch W2) to be longer than the time T402 required for disable transition thereof, i.e. T401>T402. Similarly, the clock signal TS3 prolongs the time T403 required for enable transition of the switch W3 (or the switch W4) to be longer than the time T404 required for disable transition thereof, i.e. T403>T404. The foregoing transition of a switch from a logic low level to a logic high level is defined as the enable transition thereof; however, this is not intended for limiting the scope of the present invention, and the transition of a switch from logic high level to logic low level may also be defined as the enable transition without departing from the scope of the present invention.

Besides, when one of the switches W1~W4 is at the enable transition, the equivalent impedance of the switch changes from a high value to a low value, so that the voltage over the capacitor C1 or C2 increases or decreases slowly to a constant value and accordingly voltage spike caused by transient large potential difference of the voltage is avoided. When the clock signal TS2 is enabled, the switches W1 and W2 are turned on, and accordingly the capacitor C1 is charged; when the clock signal TS3 is enabled, the switches W3 and W4 are turned on, and accordingly the capacitor C1 is discharged and the capacitor C2 is charged. Thus, the turn-on speeds of the switches W1~W4 are low while the turn-off speeds thereof are high, so that voltage spike is avoided and the charge pump circuit 300 can provide an output voltage Vout different from an input voltage Vin.

As described above, the turn-on speeds of the switches W1~W4 are controlled so that the changes in the voltages over the capacitors C1 and C2 are slowed down. In addition, the switch control circuit 302 may increase the working frequencies of the clock signals TS2 and TS3 within a reasonable range without generating continuous transient voltage spikes when the charge pump circuit 300 switches to the capacitor C1 or C2, so that voltage spike noises during charge/discharge procedures of the capacitors C1 and C2 can be reduced and the output voltage Vout can be stabilized. Moreover, since the output voltage Vout is stabilized, when the charge pump circuit 300 in the present embodiment is applied to a display panel, the common voltage level in the display panel is not disturbed by voltage spike noise, and such common voltage level renders correct pixel data and image grey scale.

FIGS. 5~8 illustrate switch driving circuits according to various embodiments of the present invention. The foregoing method of the switch control circuit 302 for outputting the clock signals TS2 and TS3 may be implemented by using a switch driving circuit. For example, a switch driving circuit may be used for generating the clock signal TS2 and another switch driving circuit may be used for generating the clock signal TS3, wherein the two clock signals TS2 and TS3 have non-overlapping duty cycles. The descriptions of embodiments illustrated with reference to FIGS. 5~8 may be referred for the implementation of the switch driving circuit; however, the scope of the present invention is not limited thereto.

Figure 5:
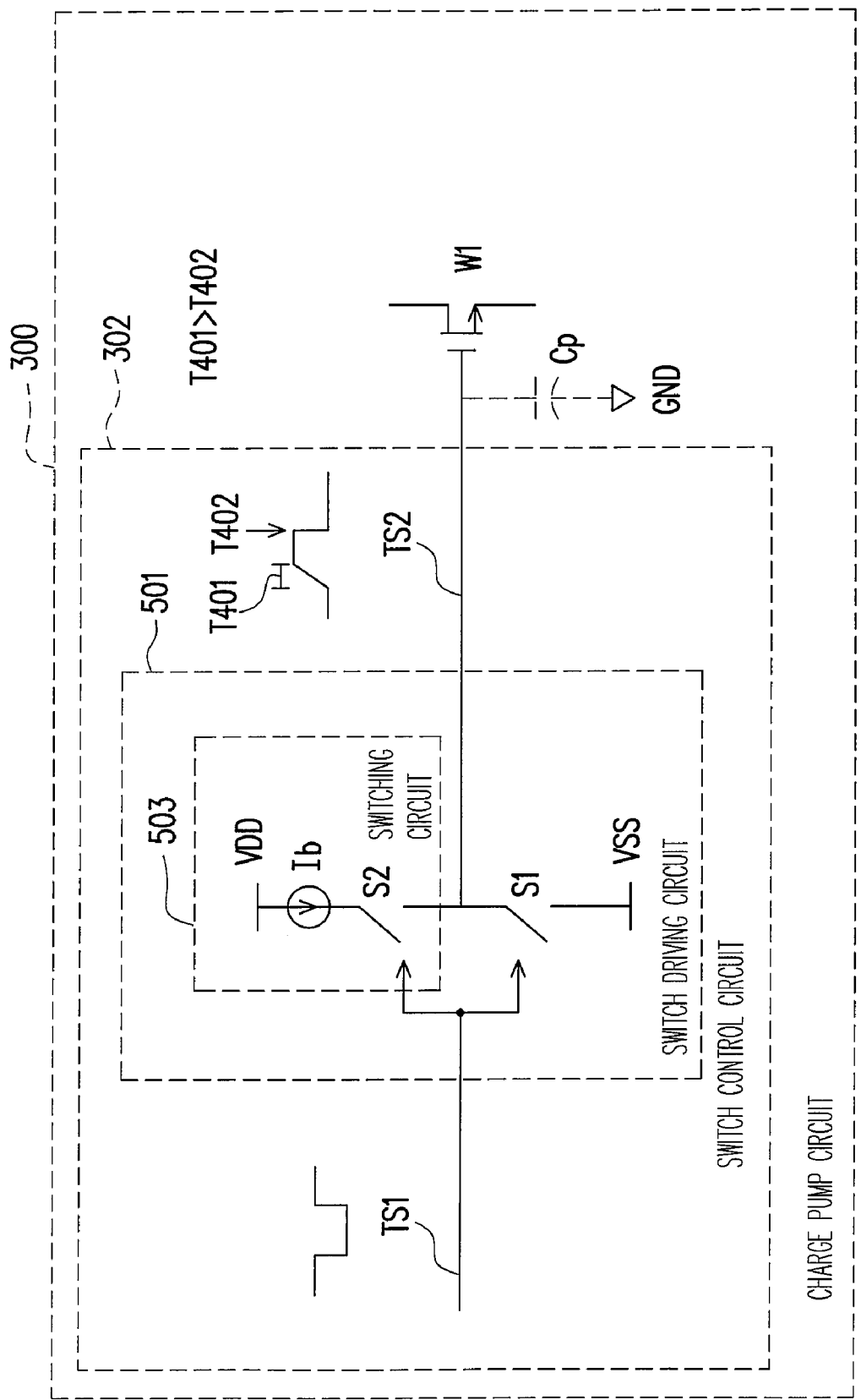
FIGS. 5~8 illustrate switch driving circuits according to various embodiments of the present invention.

Referring to FIG. 5, the switch driving circuit 501 includes a constant current source Ib, a switch S1, and a switch S2. The couplings between the various components of the switch driving circuit 501 will be described herein. The input terminal of the constant current source Ib is coupled to a supply voltage VDD, the output terminal of the constant current source Ib is coupled to the first terminal of the switch S2, the second terminal of the switch S2 is coupled to the first terminal of the switch S1, the second terminal of the switch S1 is coupled to a supply voltage VSS, and the control terminals of the switches S1 and S2 are both controlled by a clock signal TS1. The clock signal TS1 controls the switch S1 and the switch S2, wherein the switch S2 is turned off when the switch S1 is turned on, and vice versa. The clock signal TS1 may be related to working frequency. In addition, the coupling between the constant current source Ib and the switch S2 forms a switching circuit 503.

The working principle of the switch driving circuit 501 will be described herein. The switch driving circuit 501 receives the clock signal TS1 and obtains a clock signal TS2 according to the clock signal TS1, and then the switch driving circuit 501 outputs the clock signal TS2 to the control terminal of a controlled switch W1 in order to control the switch W1, wherein the controlled switch W1 is implemented with a NMOS transistor. When the controlled switch W1 is at the enable transition, the constant current source Ib of the switch driving circuit 501 provides a constant current to the stray capacitor Cp so that the voltage over the stray capacitor Cp increases linearly to a constant value; and when the controlled switch W1 is at the disable transition, the stray capacitor Cp discharges quickly. Thus, the time required for the enable transition of the controlled switch W1 is longer than that required for the disable transition thereof. The clock signal TS2 may be output from the coupling point between the switching circuit 503 and the switch S1, and the equivalent impedance of the controlled switch W1 changes from a high value to a low value when the clock signal TS2 turns on the controlled switch W1.

Figures 6, 7, 8:
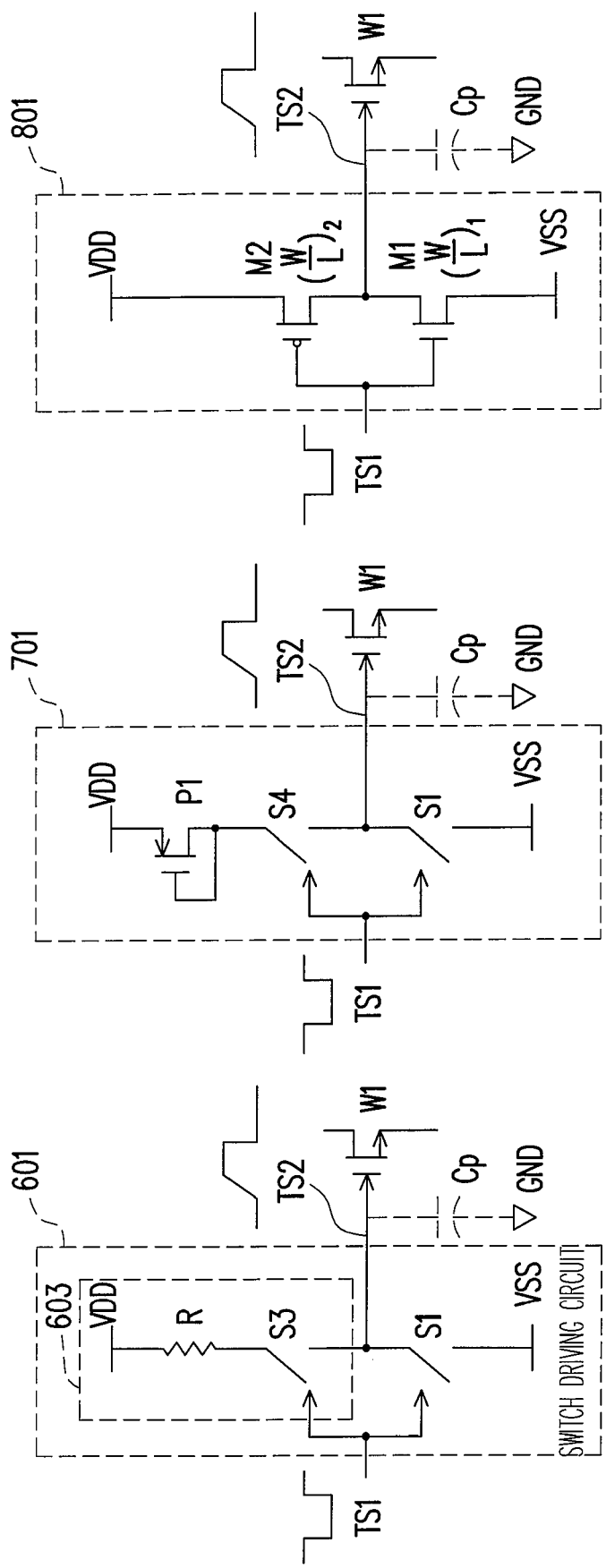

FIG. 6 illustrates a switch driving circuit according to an embodiment of the present invention, wherein the basic structure of the switch driving circuit 601 is similar to that of the switch driving circuit 501 illustrated with reference to FIG. 5, except for the switching circuit 603 is composed of a current limiting resistor R and a switch S3. Referring to FIG. 6, the switch driving circuit 601 includes the current limiting resistor R, a switch S1, and a switch S3. The couplings between foregoing components will be described hereinafter. The first terminal of the current limiting resistor R is coupled to a supply voltage VDD, the second terminal of the current limiting resistor R is coupled to the first terminal of the switch S3, the second terminal of the switch S3 is coupled to the first terminal of the switch S1, the second terminal of the switch S1 is coupled to a supply voltage VSS, and the control terminals of the switches S1 and S3 are both controlled by a clock signal TS1. The clock signal TS1 controls the switch S1 and the switch S3, wherein the switch S3 is turned off when the switch S1 is turned on, and vice versa. Thus, when the switch driving circuit 601 receives the clock signal TS1, the clock signal TS2 can be output from the coupling point between the switch S1 and the switch S3.

The working principle of the switch driving circuit 601 will be described hereinafter. The switch driving circuit 601 receives a clock signal TS1 and obtains a clock signal TS2 according to the clock signal TS1, and the switch driving circuit 601 outputs the clock signal TS2 to a control terminal of a controlled switch W1 for controlling the switch W1, wherein the controlled switch W1 is implemented with a NMOS transistor, and the time required for the enable transition of the controlled switch W1 is longer than that required for the disable transition thereof. When the controlled switch W1 is at the enable transition, the current in the current limiting resistor R continues to flow to the stray capacitor Cp so that the voltage over the stray capacitor Cp increases or decreases slowly to a constant value, thus, the clock signal TS2 makes the equivalent impedance of the controlled switch W1 to change from a high value to a low value. The change of the voltage of the clock signal TS2 is to increase slowly to a constant value; however, the present invention is not limited thereto, and the voltage change may also be linear or decrease slowly to a constant value, or it may also be a change of the current of the clock signal TS2 which is linear or increase or decrease slowly to a constant value, etc.

FIG. 7 illustrates a switch driving circuit according to an embodiment of the present invention, wherein the switch driving circuit 701 is similar to the switch driving circuits illustrated with reference to FIGS. 5 and 6. Referring to FIG. 7, the switch driving circuit 701 includes a PMOS transistor P1, a switch S1, and a switch S4. The source of the PMOS transistor P1 is coupled to a supply voltage VDD, the gate and drain of the PMOS transistor P1 are both coupled to the first terminal of the switch S4, the second terminal of the switch S4 is coupled to the first terminal of the switch S1, the second terminal of the switch S1 is coupled to a supply voltage VSS, and the control terminals of the switches S1 and S4 are both controlled by a clock signal TS1. The clock signal TS1 controls the switch S1 and the switch S4, wherein the switch S4 is turned off when the switch S1 is turned on, and vice versa. When the switch driving circuit 701 receives the clock signal TS1, the clock signal TS2 is output at the coupling point between the switch S1 and the switch S4.

The operation of the switch driving circuit 701 will be described hereinafter. The switch driving circuit 701 receives the clock signal TS1 and obtains the clock signal TS2 according to the clock signal TS1, and then the switch driving circuit 701 outputs the clock signal TS2 to a control terminal of a controlled switch W1 for controlling the switch W1, wherein the controlled switch W1 is implemented with a NMOS transistor, and the time required for the enable transition of the controlled switch W1 is longer than the time required for the disable transition thereof. When the controlled switch W1 is at enable transition, the drain current of the PMOS transistor P1 continues to flow to the stray capacitor Cp so that the voltage over the stray capacitor Cp increases slowly to a constant value, and accordingly the clock signal TS2 makes the equivalent impedance of the controlled switch W1 to change from a high value to a low value.

FIG. 8 illustrates a switch driving circuit according to an embodiment of the present invention. Referring to FIG. 8, the switch driving circuit 801 includes a MOS transistor M1 and a MOS transistor M2, wherein the aspect ratio (W/L)1 of the MOS transistor M1 is greater than the aspect ratio (W/L)2 of the MOS transistor M2, i.e. (W/L)1>(W/L)2. The first source/drain of the MOS transistor M1 is coupled to a supply voltage VDD, the second source/drain of the MOS transistor M1 is coupled to the first source/drain of the MOS transistor M2, the second source/drain of the MOS transistor M2 is coupled to a supply voltage VSS, and the control terminals of the MOS transistors M1 and M2 are both controlled by the clock signal TS1. The clock signal TS1 controls the MOS transistors M1 and M2, wherein the MOS transistor M2 is turned off when the MOS transistor M1 is turned on, and vice versa. The switch driving circuit 801 receives the clock signal TS1 and obtains a clock signal TS2 according to the clock signal TS1. Since (W/L)1>(W/L)2, the equivalent impedance of the MOS transistor M2 is greater than the equivalent impedance of the MOS transistor when they are turned on. When the controlled switch W1 is at the enable transition, the drain current of the MOS transistor M2 when it is turned on is smaller due to the larger equivalent impedance thereof, and the drain current continues to flow to the stray capacitor Cp so that the voltage over the stray capacitor Cp increases slowly to a constant value; and when the controlled switch W1 is at the disable transition, the stray capacitor Cp discharges quickly via the MOS transistor M1. The clock signal TS2 is output from the coupling point between the MOS transistor M1 and the MOS transistor M2, and the clock signal TS2 makes the equivalent impedance of the controlled switch W1 to change from a high value to a low value at the enable transition of the controlled switch W1.

Figure 9:
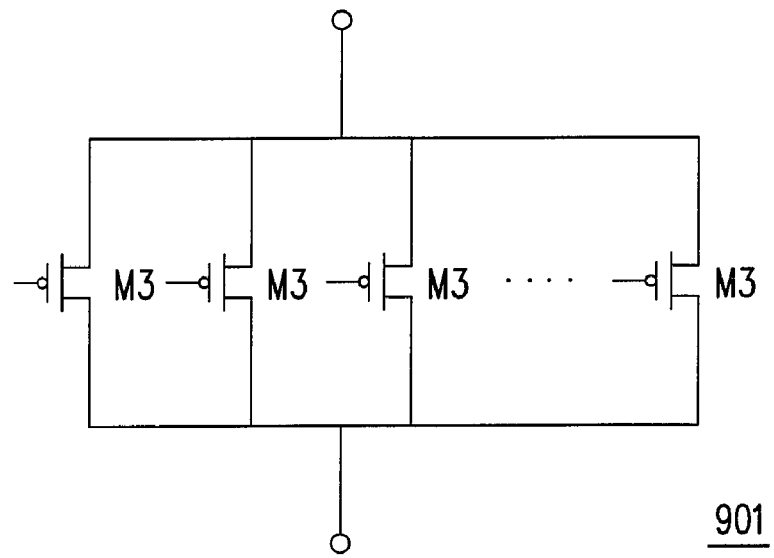
FIG. 9 is a circuit diagram of a controlled switch according to an embodiment of the present invention.

FIG. 9 is a circuit diagram of a controlled switch according to an embodiment of the present invention. The implementation of the switch W1 in FIG. 3 can be further referred to the description with reference to FIG. 9. Referring to FIG. 9, the controlled switch 901 includes a plurality of MOS transistors M3, wherein the first sources/drains of the MOS transistors M3 are all coupled together to form the first terminal of the switch W1, the second sources/drains of the MOS transistors M3 are all coupled together to form the second terminal of the switch W1, and the gates of the MOS transistors M3 are all controlled by a clock signal. However, the controlled switch 901 is sequentially turned on by enabling the MOS transistors M3, and the controlled switch 901 is turned off by disabling the MOS transistors M3 all at once. In other words, to turn on the controlled switch 901, the gates of the MOS transistors M3 are delayed so as to receive the clock signal in sequence, and since the voltage drops from the first sources/drains of MOS transistors to the second sources/drains thereof are all the same, the current quantity can be increased gradually by turning on the MOS transistor M3 one by one. Thus, when the controlled switch 901 is at the enable transition, the equivalent impedance thereof changes from a high value to a low value. In addition, the implementations of the switches W2~W4 in FIG. 3 may also be deduced with reference to the description of FIG. 9 therefore will not be described herein.

Figure 10:
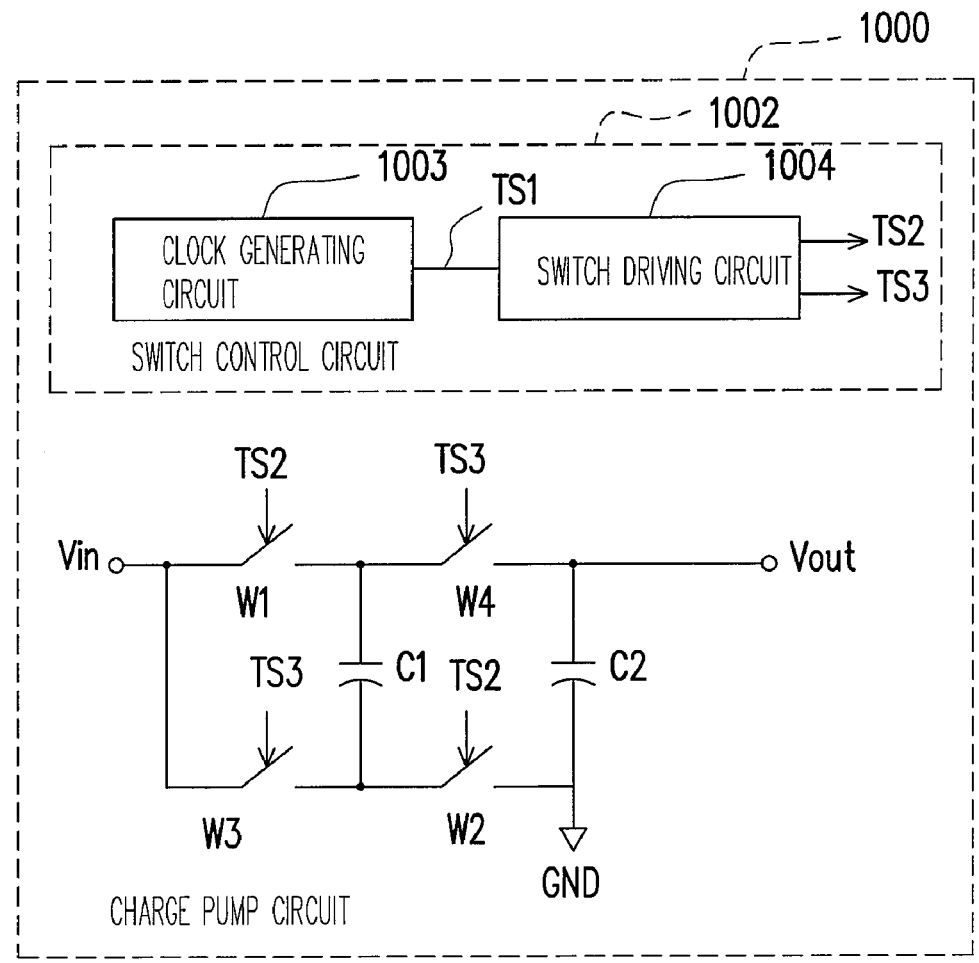
FIG. 10 illustrates a charge pump circuit according to another embodiment of the present invention.

FIG. 10 illustrates a charge pump circuit according to another embodiment of the present invention. Referring to FIG. 3 first, the switch control circuit 302 in the charge pump circuit 300 includes a switch driving circuit, and may further include a clock generating circuit as illustrated in 10. The switch control circuit 1002 includes a clock generating circuit 1003 and a switch driving circuit 1004, wherein the switch driving circuit 1004 is coupled to the output of the clock generating circuit 1003. The clock generating circuit 1003 generates a clock signal TS1 of required working frequency, and may double the working frequency according to the operation of the charge pump circuit 1000. The switch driving circuit 1004 may directly receive the clock signal TS1 and generates the clock signals TS2 and TS3 according to the clock signal TS1 for controlling the switches W1~W4. Besides, the implementation of the switch driving circuit 1004 may be further referred to foregoing descriptions of FIGS. 5~8.

In summary, according to the present invention, a switch control circuit is employed in a charge pump circuit for controlling the on/off states of a plurality of switches and allowing the charge pump circuit to provide an output voltage different from an input voltage. The switch control circuit prolongs the time required for enable transition of the switches to be longer than that required for disable transition thereof, and when the switches are at enable transition, the equivalent impedances thereof change from high values to low values. By controlling the on/off of the switches with a clock signal, the turn-on speeds of the switches are slow while the turn-off speeds thereof are much faster. Accordingly, the charge pump circuit in the present invention can be applied to a display panel or embedded into an integrated circuit. The charge pump circuit in the present invention has at least following advantages:

1. the voltage change over a capacitor is slowed down so that large transient voltage spike can be avoided;

2. voltage spike noises during a charge/discharge procedure of a capacitor are reduced so that the output voltage can be stabilized;

3. when the charge pump circuit in the present invention is applied to a display panel, since the charge pump circuit has stable output, the common voltage level in the display panel will not be disturbed by transient voltage spike and accordingly the pixel quality of display panel will not be affected;

4. when the charge pump circuit in the present invention is applied to a display panel, since there is no transient voltage spike to couple to the pixel data, the pixel data remains correct and the grey scale performance of the image remains normal; and 5. when the die size of a charge pump circuit in the present invention shrinks, the driving capability thereof can be improved by increasing the working frequency thereof.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A charge pump circuit, suitable for a display panel, comprising:

a first and second capacitors, each of the first and second capacitors having a first and second ends;

a first, second, third, and fourth switches, wherein each of the first, second, third, and fourth switches is switched from an off state to an on state being defined as an enable transition and is switched from the on state to the off state being defined as a disable transition, and each of the first, second, third, and fourth switches has a first and second ends, the first ends of the first and third switches being both coupled to an input voltage, the second ends of the first and third switches being respectively coupled to the first and second ends of the first capacitor, the first ends of the fourth and second switches being respectively coupled to the first ends of the first and third switches are both coupled to an input voltage, the second end of the fourth switch being coupled to an output voltage and the first end the second capacitor, the second end of the second switch being coupled to a low voltage and the second end the second capacitor; and a switch control circuit, coupled to the first, second, third, and fourth switches, for generating a first and second control signals, wherein the first control signal controls the on/off states of the first and second switches, the second signal controls the on/off states of the third and fourth switches, the switch control circuit prolongs time required for the enable transition of the first, second, third, and fourth switches to be longer than time required for the disable transition of the first, second, third, and fourth switches, and an equivalent impedance of each of the first, second, third, and fourth switches changes from a high value to a low value when it is at the enable transition.

2. The charge pump circuit according to claim 1, wherein the switch control circuit comprises a switch driving circuit for adjusting a first clock signal to obtain the first control signal and outputting the first control signal to the first and second switches, wherein the time required for the enable transition of each of the first and second switches is longer than the time required for the disable transition of each of the first and second switches and when each of the first and second switches is at the enable transition, a current or voltage of the first control signal increases or decreases to a constant value, and the equivalent impedance of each of the first and second switches changes from the high value to the low value.

3. The charge pump circuit according to claim 2, wherein the switch driving circuit comprises:

a switching circuit, having a first terminal coupled to a first supply voltage, a second terminal coupled to the first and second switches, and a control terminal for receiving the first clock signal; and a fifth switch, having a first terminal coupled to the second terminal of the switching circuit, a second terminal coupled to a second supply voltage, and a control terminal receiving the first clock signal, wherein the first control signal is output from a coupling point between the switching circuit and the fifth switch, the first clock signal is adapted for controlling the on/off states of the switching circuit and the first switch, and when the switching circuit transits from the off state to the on state, the current or voltage of the first control signal increases or decreases to the constant value.

4. The charge pump circuit according to claim 3, wherein the switching circuit comprises:

a constant current source, having a first terminal coupled to the first supply voltage and a second terminal; and a sixth switch, having a first terminal coupled to the second terminal of the constant current source, a second terminal coupled to the first terminal of the first switch and the first and second switches, and a control terminal for receiving the first clock signal, wherein the first control signal is output from a coupling point between the fifth switch and the sixth switch.

5. The charge pump circuit according to claim 3, wherein the switching circuit comprises:

a current limiting resistor, having a first terminal coupled to the first supply voltage and a second terminal; and a seventh switch, having a first terminal coupled to the second terminal of the current limiting resistor, a second terminal coupled to the first terminal of the fifth switch and the first and second switches, and a control terminal for receiving the first clock signal, wherein the first control signal is output from a coupling point between the fifth switch and the sixth switch.

6. The charge pump circuit according to claim 3, wherein the switching circuit comprises:

a PMOS transistor, having a first terminal coupled to the first supply voltage, a second terminal, and a gate coupled to the second terminal of the PMOS transistor,; and an eighth switch, having a first terminal coupled to the second terminal of the PMOS transistor, a second terminal coupled to the first terminal of the fifth and the first and second switches, and a control terminal for receiving the first clock signal, wherein the first control signal is output from a coupling point between the fifth switch and the eighth switch.

7. The charge pump circuit according to claim 3, wherein the fifth switch is a first MOS transistor, the switching circuit is a second MOS transistor, and a channel aspect ratio (width/length) of the first MOS transistor is greater than a channel aspect ratio (width/length) of the second MOS transistor.

8. The charge pump circuit according to claim 2, wherein the switch driving circuit also adjusts an inversed first clock signal to obtain the second control signal and outputs the second control signal to the third and fourth switches, the time required for the enable transition of each of the third and fourth switches is longer than the time required for the disable transition of each of the third and fourth switches, and when each of the third and fourth switches is at the enable transition, the current or voltage of the second control signal increases or decreases to the constant value, and the equivalent impedance of each of the third and fourth switches changes from the high value to the low value.

9. The charge pump circuit according to claim 1, wherein the first switch comprises a plurality of MOS transistors, source ends of the MOS transistors are coupled to the second end of the first switch, drain ends of the MOS transistors are coupled to the first end of the first switch, gate ends of the MOS transistors receive the first control signal, and the first control signal turns on the MOS transistors one by one.

10. A charge pump circuit, suitable for a display panel, comprising:

a first and second capacitors, each of the first and second capacitors having a first and second ends;

a first, second, third, and fourth switches, wherein each of the first, second, third, and fourth switches is switched from an off state to an on state being defined as an enable transition, and is switched from the on state to the off state being defined as a disable transition, and each of the first, second, third, and fourth switches has a first and second ends, the first ends of the first and third switches being both coupled to an input voltage, the second ends of the first and third switches being respectively coupled to the first and second ends of the first capacitor, the first ends of the fourth and second switches being respectively coupled to the first ends of the first and third switches being both coupled to an input voltage, the second end of the fourth switch being coupled to an output voltage and the first end the second capacitor, the second end of the second switch being coupled to a low voltage and the second end the second capacitor;

a switch driving circuit, coupled to the switches for receiving a first clock signal, for outputting a first and second control signals, wherein the first control signal controls the on/off states of the first and second switches, the second signal controls the on/off states of the third and fourth switches, the switch driving circuit prolongs time required for the enable transition of the first, second, third, and fourth switches to be longer than time required for the disable transition of the first, second, third, and fourth switches, and an equivalent impedance of each of the first, second, third, and fourth switches changes from a high value to a low value when it is at the enable transition; and a clock generating circuit, coupled to the switch driving circuit for generating the first clock signal and allowing the charge pump circuit to provide the output voltage different from the input voltage.

11. The charge pump circuit according to claim 10, wherein the switch driving circuit adjusts a first clock signal to obtain the first control signal and outputs the first control signal to the first and second switches, the time required for the enable transition of each of the first and second switches is longer than the time required for the disable transition of each of the first and second switches, and when each of the first and second switches is at the enable transition, a current or voltage of the first control signal increases or decreases to a constant value, and the equivalent impedance of each of the first and second switches changes from the high value to the low value.

12. The charge pump circuit according to claim 11, wherein the switch driving circuit comprises:

a switching circuit, having a first terminal coupled to a first supply voltage, a second terminal coupled to first and second switches, and a control terminal for receiving the first clock signal; and a fifth switch, having a first terminal coupled to the second terminal of the switching circuit, a second terminal coupled to a second supply voltage, and a control terminal for receiving the first clock signal, wherein the first control signal is output from a coupling point between the switching circuit and the first switch, wherein the first clock signal is used for controlling the on/off states of the switching circuit and the first switch, and when the switching circuit transits from off state to on state, the current or voltage of the first control signal increases or decreases to the constant value.

13. The charge pump circuit according to claim 12, wherein the switching circuit comprises:

a constant current source, having a first terminal coupled to the first supply voltage and a second terminal; and a sixth switch, having a first terminal coupled to the second terminal of the constant current source, a second terminal coupled to the first terminal of the fifth switch and the first and second switches, and a control terminal for receiving the first clock signal, wherein the first control signal is output from a coupling point between fifth switch and the sixth switch.

14. The charge pump circuit according to claim 12, wherein the switching circuit comprises:

a current limiting resistor, having a first terminal coupled to the first supply voltage and a second terminal; and a seventh switch, having a first terminal coupled to the second terminal of the current limiting resistor, a second terminal coupled to the first terminal of the fifth switch and the first and second switches, and a control terminal for receiving the first clock signal, wherein the first control signal is output from a coupling point between the fifth switch and the sixth switch.

15. The charge pump circuit according to claim 12, wherein the switching circuit comprises:

a PMOS transistor, having a first terminal coupled to the first supply voltage, a second terminal, and a gate coupled to the second terminal of the PMOS transistor; and a eighth switch, having a first terminal coupled to the second terminal of the PMOS transistor, a second terminal coupled to the first terminal of the fifth switch and the first and second switches, and a control terminal for receiving the first clock signal, wherein the first control signal is output from a coupling point between the fifth switch and the eighth switch.

16. The charge pump circuit according to claim 12, wherein the fifth switch is a first MOS transistor, the switching circuit is a second MOS transistor, and a channel aspect ratio (width/length) of the first MOS transistor is greater than a channel aspect ratio (width/length) of the second MOS transistors.

17. The charge pump circuit according to claim 11, wherein the switch driving circuit also adjusts an inversed first clock signal to obtain the second control signal and outputs the second control signal to the third and fourth switches, the time required for the enable transition of each of the third and fourth switches is longer than the time required for the disable transition of each of the third and fourth switches, and when each of the third and fourth switches is at the enable transition, the current or voltage of the second control signal increases or decreases to the constant value, and the equivalent impedance of each of the third and fourth switches change from the high value to the low value.

18. The charge pump circuit according to claim 10, wherein the first switch comprises a plurality of MOS transistors, source ends of the MOS transistors are coupled to the second end of the first switch, drain ends of the MOS transistors are coupled to the first end of the first switch, the gate ends of the MOS transistors receive the first control signal, and the first control signal turns on the MOS transistors one by one.

19. A charge pump circuit, comprising:

a plurality of switches, switching from an off state to an on state being defined as an enable transition, and switching from the on state to the off state being defined as a disable transition; and a switch control circuit, coupled to the switches, for controlling the on/off states of the switches and allowing the charge pump circuit to provide an output voltage different from an input voltage, wherein the switch control circuit prolongs time required for the enable transition of the switches to be longer than time required for the disable transition of the switches, and equivalent impedances of the switches change from high values to low values when the switches are at the enable transitions, wherein each of the switches comprises a plurality of MOS transistors, source ends of the MOS transistors are coupled to one end of each of the switches, drain ends of the MOS transistors are coupled to another end of each of the switches, and gate ends of the MOS transistors are coupled to the switch control circuit, so as to turn on the MOS transistors one by one.

20. The charge pump circuit according to claim 19, wherein the switch control circuit comprises a switch driving circuit for adjusting a first clock signal to obtain a second clock signal and outputting the second clock signal to a control terminal of a controlled switch among the switches, wherein the time required for the enable transition of the controlled switch is longer than the time required for the disable transition of the controlled switch, and when the controlled switch is at the enable transition, the current or voltage of the second clock signal increases or decreases to a constant value, and the equivalent impedance of the controlled switch changes from a high value to a low value.

21. The charge pump circuit according to claim 20, wherein the switch driving circuit comprises:
   a switching circuit, having a first terminal coupled to a first supply voltage, a second terminal coupled to the control terminal of the controlled switch, and a control terminal for receiving the first clock signal; and
   a first switch, having a first terminal coupled to the second terminal of the switching circuit, a second terminal coupled to a second supply voltage, and a control terminal for receiving the first clock signal, wherein the second clock signal is output from a coupling point between the switching circuit and the first switch,
   wherein the first clock signal is used for controlling the on/off states of the switching circuit and the first switch, and when the switching circuit transits from off state to on state, the current or voltage of the second clock signal increases or decreases to a constant value.

22. The charge pump circuit according to claim 21, wherein the switching circuit comprises:
   a constant current source, having a first terminal coupled to the first supply voltage and a second terminal; and
   a second switch, having a first terminal coupled to the second terminal of the constant current source, a second terminal coupled to the first terminal of the first switch and the control terminal of the controlled switch, and a control terminal for receiving the first clock signal, wherein the second clock signal is output from a coupling point between the first switch and the second switch.

23. The charge pump circuit according to claim 21, wherein the switching circuit comprises:
   a current limiting resistor, having a first terminal coupled to the first supply voltage and a second terminal; and
   a third switch, having a first terminal coupled to the second terminal of the current limiting resistor, a second terminal coupled to the first terminal of the first switch and the control terminal of the controlled switch, and a control terminal for receiving the first clock signal, wherein the second clock signal is output from a coupling point between the first switch and the third switch.

24. The charge pump circuit according to claim 21, wherein the switching circuit comprises:
   a PMOS transistor, having a first terminal coupled to the first supply voltage, a second terminal, and a gate coupled to the second terminal of the PMOS transistor; and
   a fourth switch, having a first terminal coupled to the second terminal of the PMOS transistor, a second terminal coupled to the first terminal of the first switch and the control terminal of the controlled switch, and a control terminal for receiving the first clock signal, wherein the second clock signal is output from a coupling point between the first switch and the fourth switch.

25. The charge pump circuit according to claim 21, wherein the first switch is a first MOS transistor, the switching circuit is a second MOS transistor, and a channel aspect ratio (width/length) of the first MOS transistor is greater than a channel aspect ratio (width/length) of the second MOS transistor.

* * * * *